(12) United States Patent
Cao et al.

(10) Patent No.: US 6,377,731 B1
(45) Date of Patent: Apr. 23, 2002

(54) OPTICAL CROSS CONNECT UTILIZING GRATING-BASED CHANNEL ROUTERS

(75) Inventors: Simon X. F. Cao, Pleasanton; Olga Gorbounova, Santa Clara, both of CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/579,342

(22) Filed: May 25, 2000

(51) Int. Cl.[7] .................................................. G02B 6/42
(52) U.S. Cl. ........................................................ 385/39
(58) Field of Search ............................. 385/13, 24, 8, 385/9, 37, 3, 18, 19, 11, 2; 359/117, 124, 128, 161; 370/223, 228, 242; 372/96, 106, 108

(56) References Cited

U.S. PATENT DOCUMENTS

| | | | |
|---|---|---|---|
| 5,805,320 A | * | 9/1998 | Kuroyanagi et al. ........ 359/117 |
| 6,243,507 B1 | * | 6/2001 | Goldstein et al. ............. 385/13 |
| 6,252,698 B1 | * | 6/2001 | Oikawa ....................... 359/326 |
| 6,278,689 B1 | * | 8/2001 | Afferton et al. ............. 370/223 |
| 6,285,810 B1 | * | 9/2001 | Fincato et al. ................. 385/24 |

* cited by examiner

Primary Examiner—Akm E. Ullah
(74) Attorney, Agent, or Firm—Sawyer Law Group LLP

(57) ABSTRACT

The present invention provides an improved optical cross connect (OXC) which utilizes interleaved channel separators and grating-based channel separators. The OXC includes a plurality of de-multiplexing interleaved channel separators; a plurality of multiplexing interleaved channel separators; and a plurality of channel routers optically coupled between the plurality of de-multiplexing interleaved channel separators and the plurality of multiplexing interleaved channel separators, where each of the channel routers includes: a grating comprising an alignment surface, a first sleeve comprising a mount, the mount capable of contacting the grating, and an alignment plate coupled to an outer surface of the first sleeve, wherein the alignment plate is capable of contacting the alignment surface of the grating. This grating-based channel separator affords a quick, easy, precise and reproducible positioning and alignment of the grating block. Thus, the OXC is minimized in size while also reproducibly assembled with perfect alignment in a minimal amount of time.

23 Claims, 16 Drawing Sheets

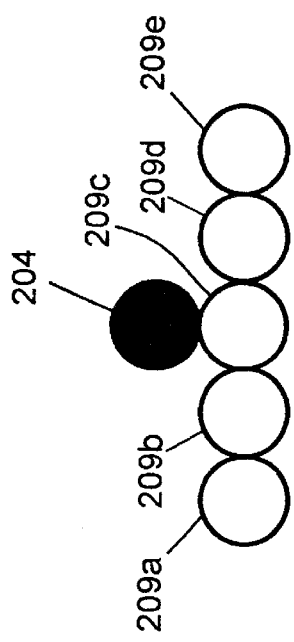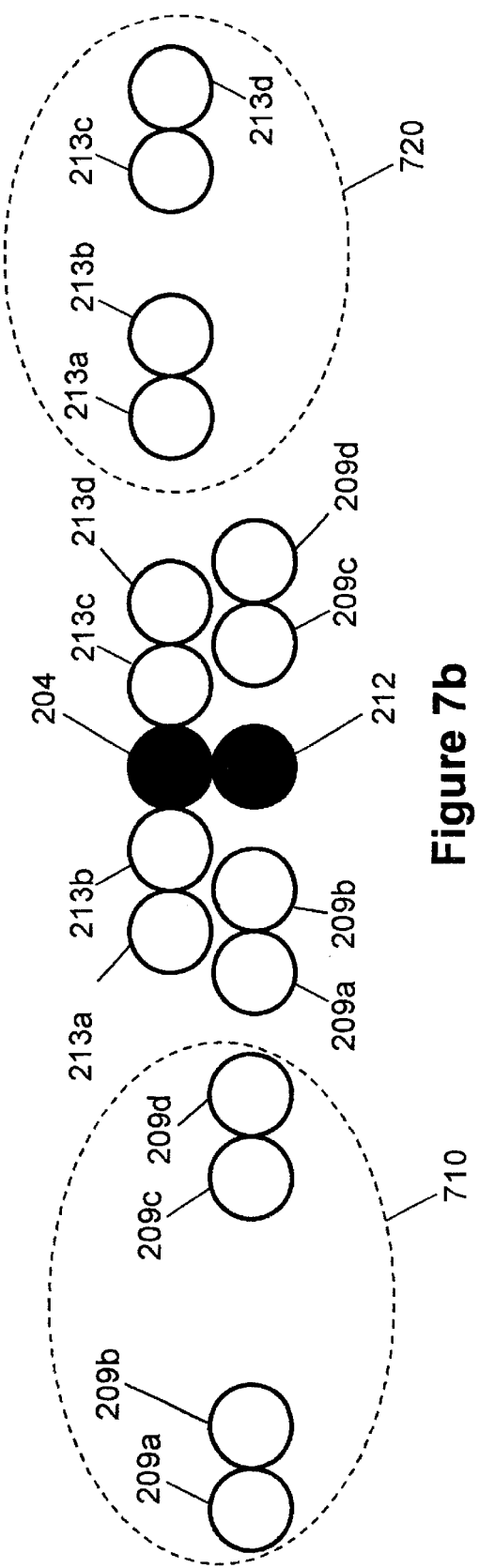

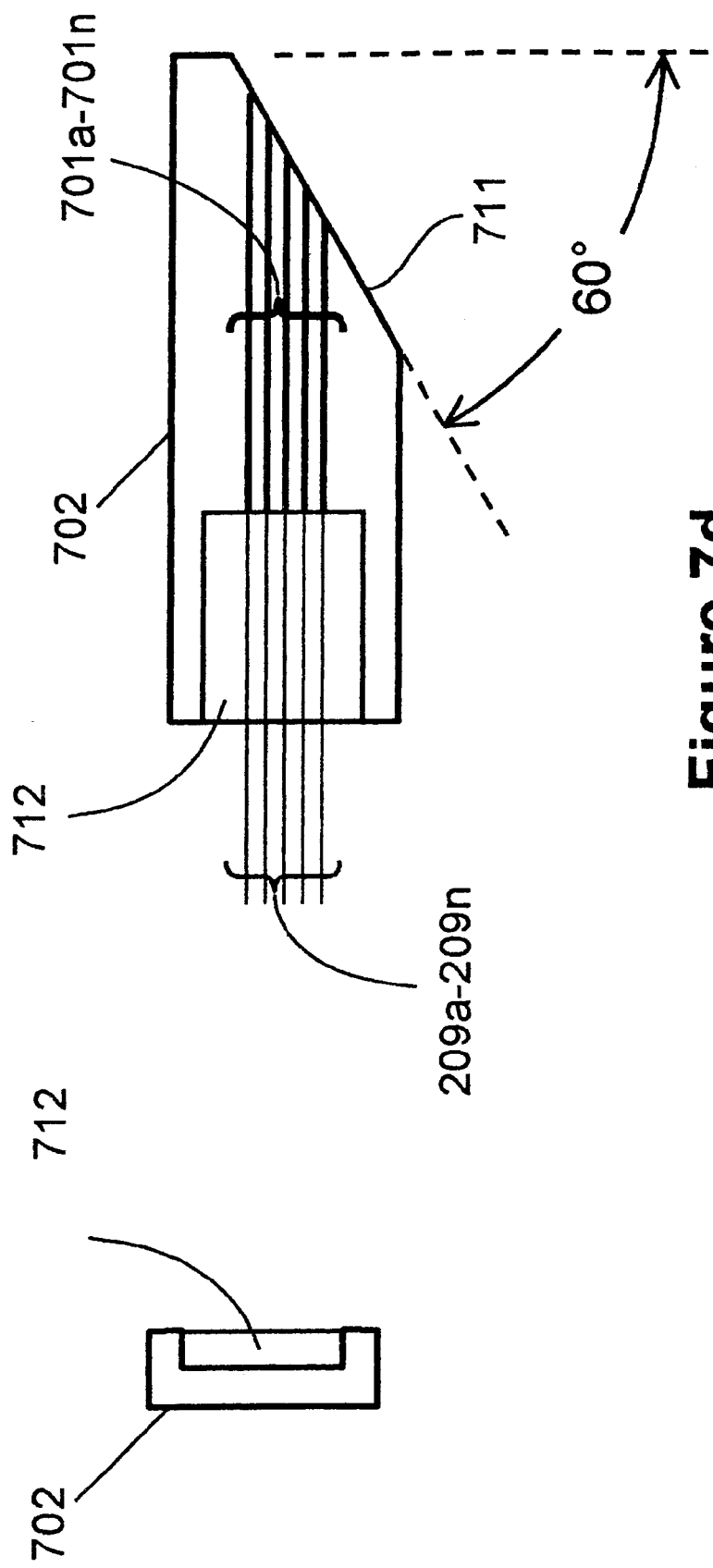

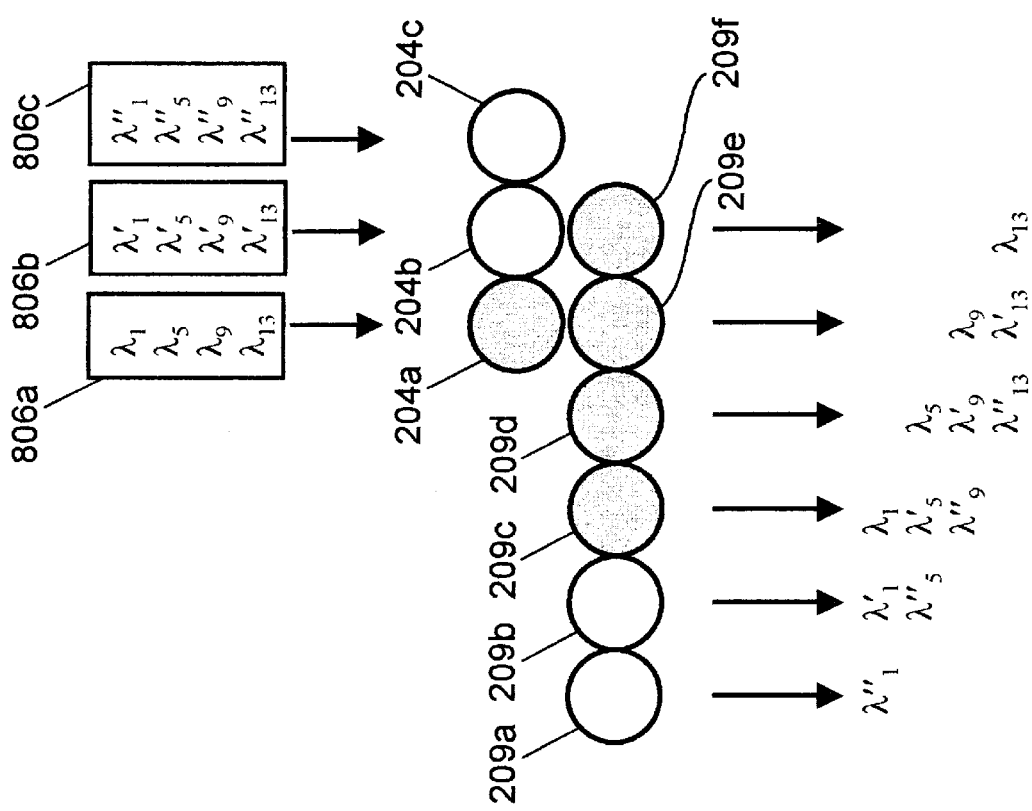

OPTICAL CROSS CONNECT UTILIZING GRATING-BASED CHANNEL ROUTERS

FIELD OF THE INVENTION

The present invention relates to optical cross connects in optical communications networks and systems, and more particularly to optical cross connects utilizing grating-based channel routers.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this document, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength," denoted by the Greek letter $\lambda$ (lambda) is used herein in two senses. In the first usage, this term is used according to its common meaning to refer to the actual physical length comprising one full period of electromagnetic oscillation of a light ray or light beam. In its second usage, the term "wavelength" is used synonymously with the terms "signal" or "channel." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1 - \lambda_n$. Used in this sense, the term "wavelength" may be understood to refer to "the channel nominally comprised of light of a range of physical wavelengths centered at the particular wavelength, $\lambda$."

A crucial feature of fiber optic networks is the separation of the composite optical signal into its component wavelengths or channels, typically by a wavelength division multiplexer. This separation must occur to allow for the exchange of signals between loops within optical communications networks. The exchange typically occurs at connector points, or points where two or more loops intersect for the purpose of exchanging wavelengths.

FIG. 1a schematically illustrates one form of an add/drop system, which typically exists at connector points for the management of the channel exchanges. The exchanging of data signals involves the exchanging of matching wavelengths from two different loops within an optical network. In other words, each composite optical signal drops a channel to the other loop while simultaneously adding the matching channel from the other loop.

A wavelength division multiplexer (WDM) typically performs separation of a composite optical signal into component channels in an add/drop system. Used in its reverse sense, the same WDM can combine different channels, of different wavelengths, into a single composite optical signal. In the first instance, this WDM is strictly utilized as a de-multiplexer and, in the second instance, it is utilized as a multiplexer. However, the term "multiplexer" is typically used to refer to such an apparatus, regardless of the "direction" in which it is utilized.

FIG. 1a illustrates add/drop systems 218 and 219 utilizing wavelength division multiplexers 220 and 230. A composite optical signal from Loop 110 ($\lambda_1 - \lambda_n$) enters its add/drop system 218 at node A (240). The composite optical signal is separated into its component channels by the WDM 220. Each channel is then outputted to its own path 250-1 through 250-n. For example, $\lambda_1$ would travel along path 250-1, $\lambda_2$ would travel along path 250-2, etc. In the same manner, the composite optical signal from Loop 150 ($\lambda_1' - \lambda_n'$) enters its add/drop system 219 via node C (270). The signal is separated into its component channels by the WDM 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new composite optical signal by the WDM 230. The new signal is then returned to Loop 150 via node D 290. At the same time, $\lambda_1'$ is transferred from path 280-1 to path 250-1. It is combined with the others of Loop 110's channels into a single new composite optical signal by the WDM 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. This is the add/drop function.

FIG. 1b illustrates a second form by which add/drop systems 218 and 219 may be configured. In FIG. 1b, each WDM is optically coupled to a first plurality of paths through which channels are outputted and to a second plurality of paths through which signals are inputted. For instance, the paths 250-1, 250-2, . . . , 250-n are utilized to output signals comprising wavelengths $\lambda_1$, $\lambda_2$, . . . , $\lambda_n$, respectively, from the WDM 220 and the paths 251-1, 251-2, . . . , 251-n are utilized to input signals comprising such wavelengths to the WDM 220. Likewise, as shown in FIG. 1b, the paths 280-1, 280-2, . . . , 280-n are utilized to output signals $\lambda_1'$, $\lambda_2'$, . . . , $\lambda_n'$ (comprising the physical wavelengths $\lambda_1, \lambda_2, \ldots, \lambda_n$) respectively, from the WDM 230 and the paths 281-1, 281-2, . . . , 281-n are utilized to input signals comprising such wavelengths to the WDM 230.

A "channel separator" or, simply, "separator," as the term is used in this specification, is an integrated collection of optical components functioning as a unit, which separates one or more channels of a composite optical signal from one another. These separators may be used as channel routers in an optical cross connect (OXC) which effectuates the adding and dropping of channels as described above.

FIGS. 2a and 2b illustrate a top view and side view, respectively, of a prior-art grating-based channel separator. In the separator 200, a concave reflection-type holographic grating 202 is disposed upon a substrate plate or block 201 comprised of a material with low thermal expansion. The grating 202, which comprises a portion of a spherical surface 206 centered at point 210, receives a wavelength-division multiplexed composite optical signal 211 input to the separator 200 from an input fiber 204. The composite optical signal 211 is comprised of a plurality of individual channels, $\lambda_1, \lambda_2, \ldots$ The concave grating 202 diffracts, reflects, focuses and spatially disperses each of these individual channels according to its respective wavelength such that each channel is directed to exactly one of a plurality of output fibers 209a–209b. For instance, referring to FIG. 2a, if input signal 201 is comprised of two channels, namely channel $\lambda_1$ (207a) and channel $\lambda_2$ (207b) with $\lambda_1<\lambda_2$, then, upon back-diffraction from grating 202, the $\lambda_1$ channel (207a) and the $\lambda_2$ channel (207b) are focused onto the end of fiber 209a and fiber 209b, respectively.

The input fiber 204 and the plurality of output fibers 209a–209c are disposed within an array 205 of fibers. The end faces of the fibers in array 205 are disposed along or parallel to a plane 208 which makes an angle of 60° with the line 203 that is normal to the grating 202 at the center of the grating 202. With this disposition, the grating 202 diffracts light according to the Littrow configuration, in which the angles of incidence and diffraction are approximately equal. FIG. 2b shows a side view of the prior art apparatus taken parallel to the fiber 204. FIG. 2b shows that the fibers are directed towards the grating vertex and are at an angle to the grating dispersion plane 215. The input fiber 204 and the output fibers 209a–209c each make the same angle φ (taken without regard to algebraic sign) with respect to the dispersion plane 215 and the input fiber 204 makes an angle of 2φ with respect to the plane of the output fibers. With channels spaced at 0.33 nm, fiber-to-fiber losses within the separator 200 can be maintained at less than 1 dB and ultra-low crosstalk can be maintained.

For use in commercial optical communications systems, the separator's packaging must be configured such that the size of the WDM is minimized while also such that the WDM can be reproducibly assembled with perfect alignment in a minimal amount of time. Furthermore, the WDM must be packaged or mounted in such a fashion that there is minimal temperature sensitivity. These conditions are problematic since, not only must the grating be positioned precisely with respect to the input and output optical fibers, but also must the angle of the fibers relative to the grating surface and the rotation of the grating surface about its optical axis be precisely and accurately controlled. Slight mis-alignment of the grating and the fibers or of the tilt or rotation of the grating can lead to severe insertion loss and cross talk penalties.

Accordingly, there exists a need for an improved optical cross connect utilizing a grating-based channel separator. The grating-based channel separator should comprise a packaging which affords, easy, precise, and reproducible positioning and alignment of its diffraction grating. The present invention addresses such a need.

SUMMARY OF THE INVENTION

The present invention provides an improved optical cross connect (OXC) which utilizes interleaved channel separators and grating-based channel separators. The OXC includes a plurality of de-multiplexing interleaved channel separators; a plurality of multiplexing interleaved channel separators; and a plurality of channel routers optically coupled between the plurality of de-multiplexing interleaved channel separators and the plurality of multiplexing interleaved channel separators, where each of the channel routers includes: a grating comprising an alignment surface, a first sleeve comprising a mount, the mount capable of contacting the grating, and an alignment plate coupled to an outer surface of the first sleeve, wherein the alignment plate is capable of contacting the alignment surface of the grating. This grating-based channel separator affords a quick, easy, precise and reproducible positioning and alignment of the grating block. Thus, the OXC is minimized in size while also reproducibly assembled with perfect alignment in a minimal amount of time.

BRIEF DESCRIPTION OF THE FIGURES

FIGS. 7a and 7b illustrate end views of input and output fibers in two possible configurations of a fiber array of the channel separator in accordance with the present invention.

FIG. 7d illustrates an end view and a side view of the fiber alignment block of the channel separator in accordance with the present invention.

FIG. 8c illustrates input and output fibers and signals carried within a grating-based channel router in accordance with the present invention.

DETAILED DESCRIPTION

The present invention provides an improved optical cross connect (OXC) utilizing a grating-based channel separator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A preferred embodiment of an OXC in accordance with the present invention comprises interleaved channel separators and grating-based channel separators. Each of the grating-based channel separators comprises a concave holographic reflection grating with an alignment surface, a first hollow sleeve or cylinder with a mount for contacting the concave holographic reflecting grating and alignment surface, a pin or plate to align the alignment surfaces of the grating and the first hollow sleeve or cylinder, and a second hollow sleeve or cylinder with a spring-loaded holding mechanism in contact with the back side of the grating substrate.

To more particularly describe the features of the present invention, please refer to FIGS. 3 through 8d in conjunction with the discussion below.

FIGS. 3 through 7e illustrate a preferred embodiment of a grating-based channel separator used in the OXC in accordance with the present invention. This grating-based channel separator is disclosed in co-pending U.S. Patent Application entitled, "Packaging For Grating-Based WDM Router", Ser. No. 09/579,208, filed on May 25, 2000. Applicants hereby incorporate this patent application by reference.

Figure 3:
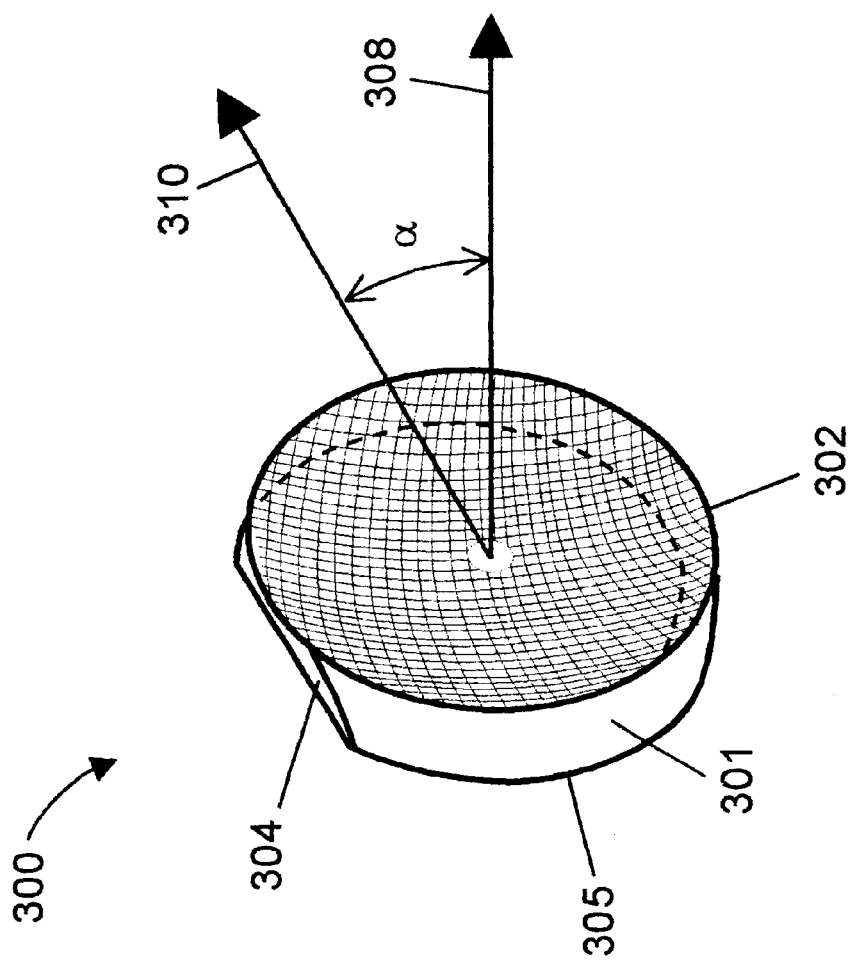
FIG. 3 illustrates, in perspective view, a concave holographic grating block of a channel separator in accordance with the present invention.

FIG. 3 illustrates, in perspective view, a concave holographic grating block of a channel separator in accordance with the present invention. The grating block 300 comprises a diffraction grating 302 disposed on the concave surface of a substrate plate 301. The grating 302 comprises a reflective concave surface or film in the geometric form of a spherical cap. The grating axis 308 is perpendicular to the chord to spherical cap grating surface 302 at the center of this surface. The back surface 305 of substrate plate 301 is opposite to the grating surface 302. An alignment surface 304 is formed or cut within substrate plate 301 at an oblique angle with respect to the grating surface 302.

A plurality of holographically formed grooves or Bragg diffraction surfaces is disposed upon or within the grating 302. The grooves or Bragg surfaces comprise the light scattering elements of grating 302 and represent an interference fringe pattern produced using the well-known technique of holography. The grooves or Bragg surfaces of grating 302 are disposed such that the grating 302 operates in the Littrow configuration-that is, such that light rays delivered to the grating 302 and light rays diffracted from the grating are substantially parallel to a single axis 310 disposed at a particular angle $\alpha$ to the grating axis.

Figure 4:
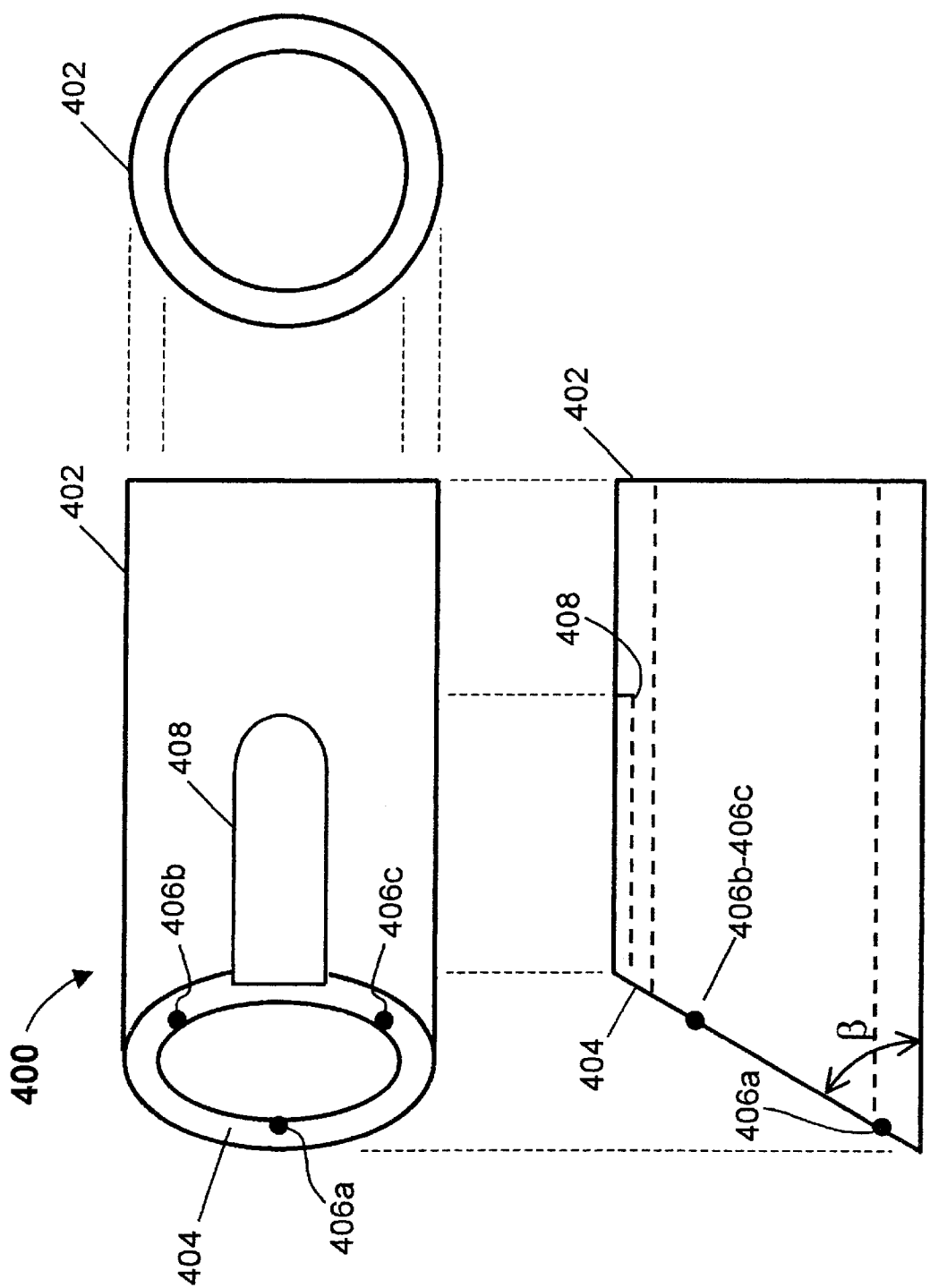
FIG. 4 illustrates a grating mounting block utilized in conjunction with the concave holographic grating of the channel separator in accordance with the present invention.

FIG. 4 illustrates a grating mounting block utilized in conjunction with the concave holographic grating of the channel separator in accordance with the present invention. The mounting block 400 comprises a hollow rod 402. A slanted surface 404 is cut or formed at one end of rod 402 and carries a plurality of rounded mounting pins or mounting balls 406a–406c. In the preferred embodiment, three mounting pins are used. The slant angle $\beta$ that the surface 404 makes with the axis of the rod 402 is substantially equal to the complement of the angle of incidence of input signal light rays delivered to the grating 302 in Littrow configuration. Further, a groove or slot 408 is cut or formed on the outer side surface of hollow rod 402.

Figure 5:
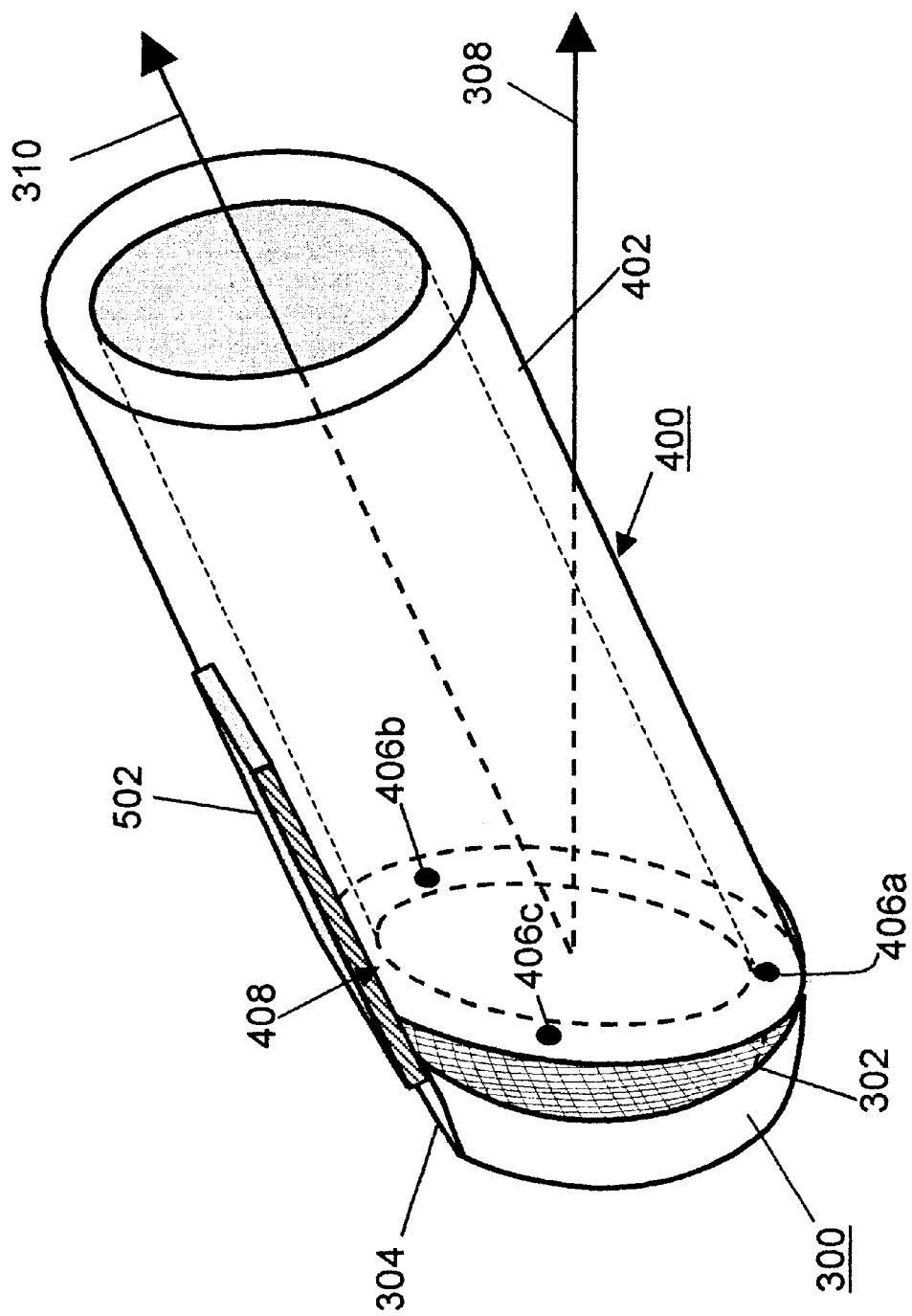
FIG. 5 illustrates a perspective view of a concave holographic grating disposed adjacent to a grating mounting block of the channel separator in accordance with the present invention.

FIG. 5 illustrates a perspective view of a concave holographic grating disposed adjacent to a grating mounting block of the channel separator in accordance with the present invention. The three rounded mounting pins 406a–406c comprise the sole contact points between the grating surface 302 and the mounting block 400. A rotational alignment pin or plate 502 is disposed so as to contact both the alignment surface 304 of grating block 300 and the slot 408 of hollow rod 402. The rotational alignment pin or plate 502 locks the rotational alignment of grating surface 302 such that the Littrow axis 310 is substantially parallel to the long axis of hollow rod 402. The alignment plate 502 is secured to rod 402 by adhesive, epoxy, solder, or the like.

Figure 6:
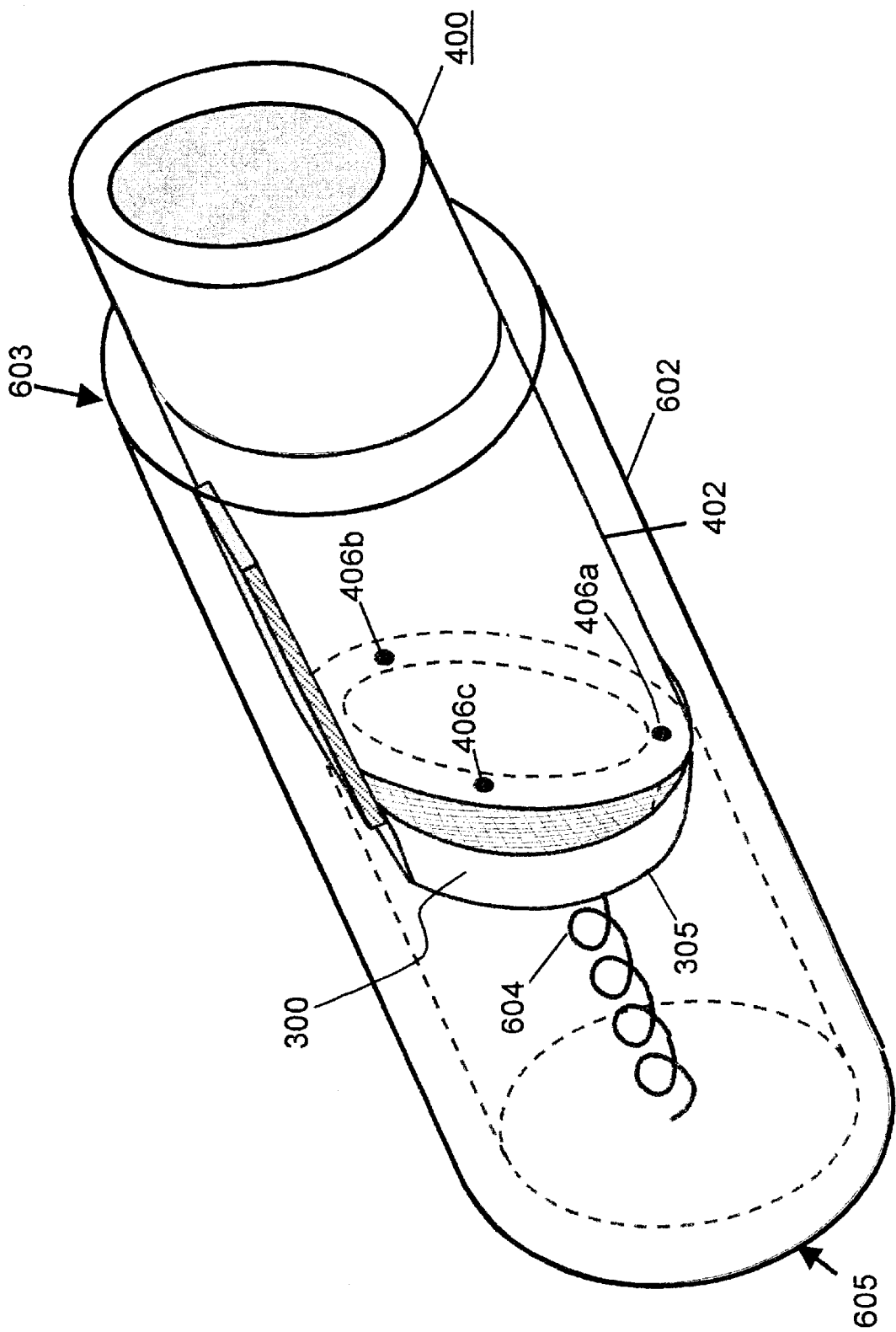
FIG. 6 illustrates further details of the assembly and alignment of the grating block of the channel separator in accordance with the present invention.

FIG. 6 illustrates further details of the assembly and alignment of the grating block within the channel separator in accordance with the present invention. The grating block 300 is housed within an outer protective tube or sleeve 602. The sleeve 602 is open only at its front end 603 and is sealed at its back end 605. The inner diameter of the sleeve 602 is large enough to fit over at least a portion of the hollow rod 402. A holding mechanism 604 housed within the sleeve 602 applies force to the back face 305 of grating block 300. In the preferred embodiment, the holding mechanism 604 is spring-loaded. This force is such that, when sleeve 602 is fitted over rod 402, the spring mechanism 604 forces the grating block 300 into its proper alignment against the pins 406a–406c and the alignment plate 502.

FIGS. 7a and 7b illustrate end views of input and output fibers in two possible configurations of a fiber array of the channel separator in accordance with the present invention. FIG. 7a and 7b respectively illustrate a single planar array and a double planar array configuration of the fibers comprising fiber array 205. In both FIG. 7a and FIG. 7b, fiber 204 is an input/output fiber that carries, either as input or output, a wavelength division multiplexed composite optical signal and fibers 209a–209e are a plurality of output/input fibers wherein each such fiber carries, either as output or input, a single signal comprising an individual wavelength. In FIG. 7b, fiber 212 is a second input/output fiber corresponding to fiber 204 and fibers 213a–213d are a second plurality of output/input fibers corresponding to the set 209a–209d.

Figure 1A:
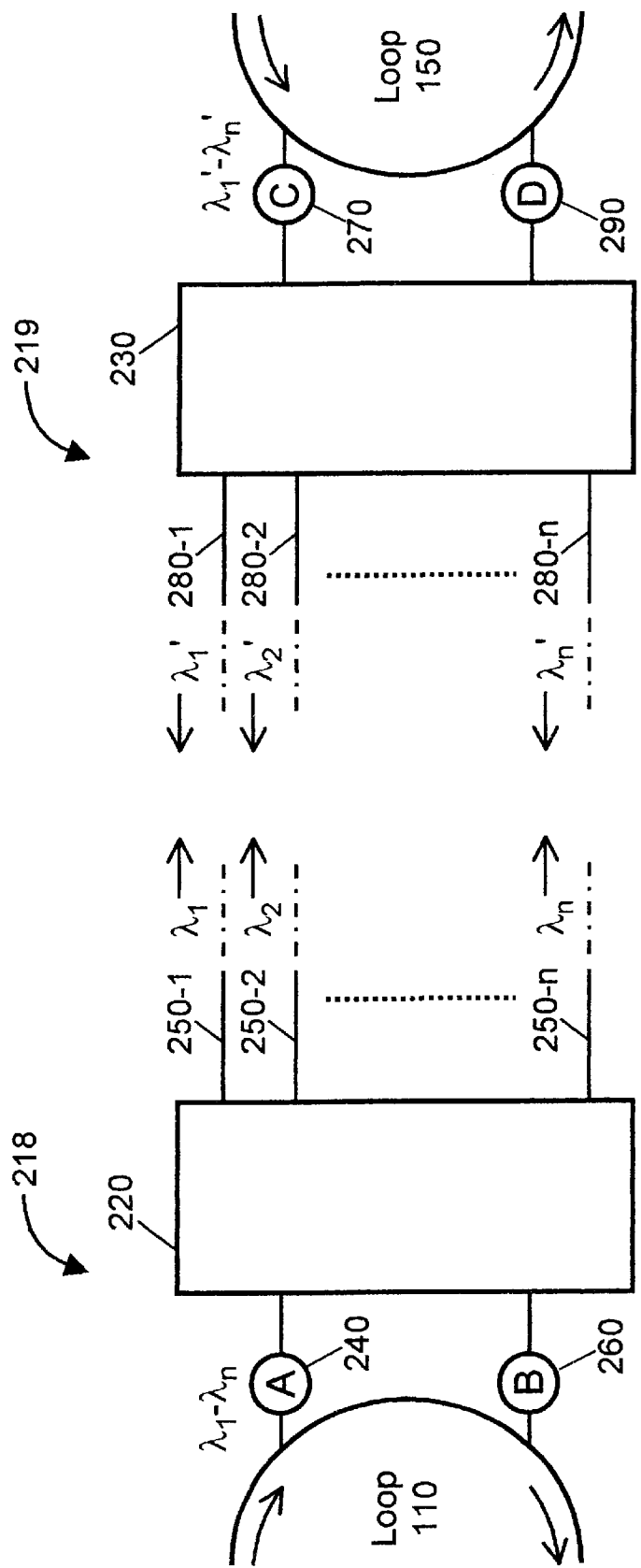
FIG. 1a and FIG. 1b illustrate two configurations of conventional add/drop systems utilizing wavelength division multiplexers (WDM).
Figure 1B:
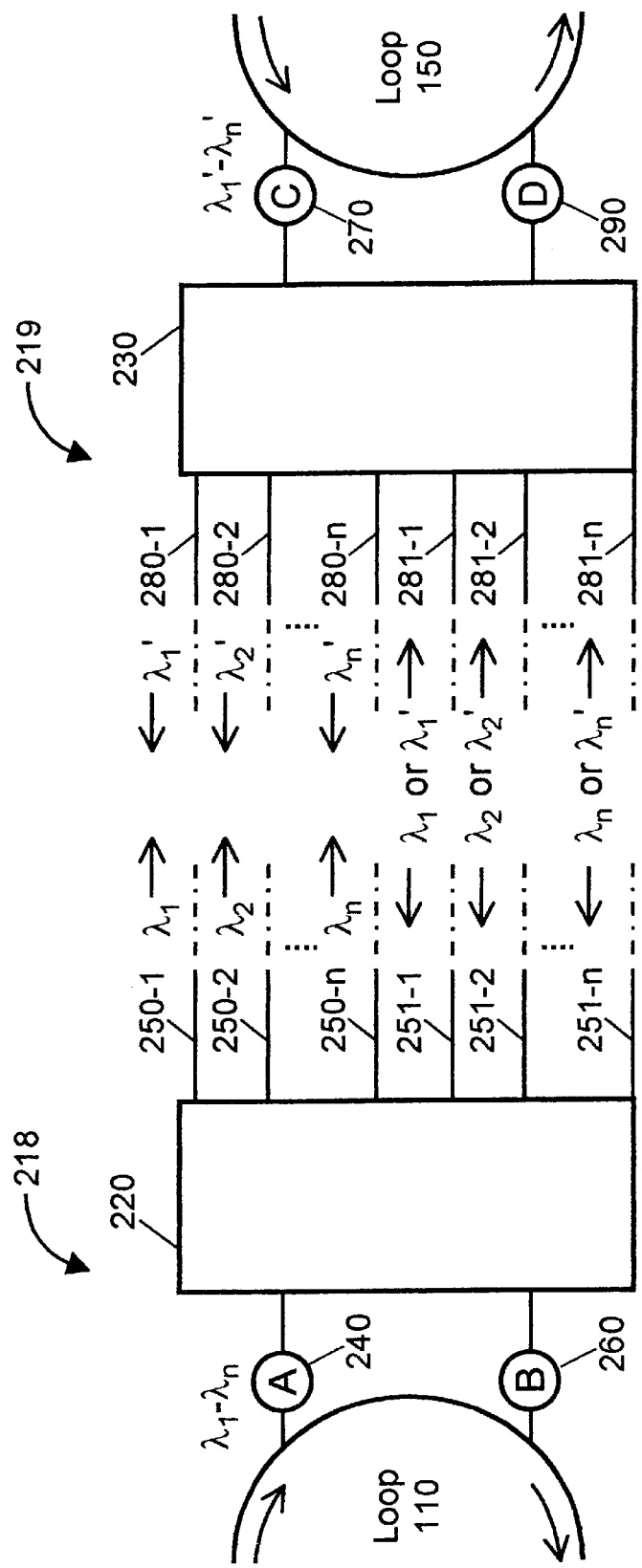
Figure 2A:
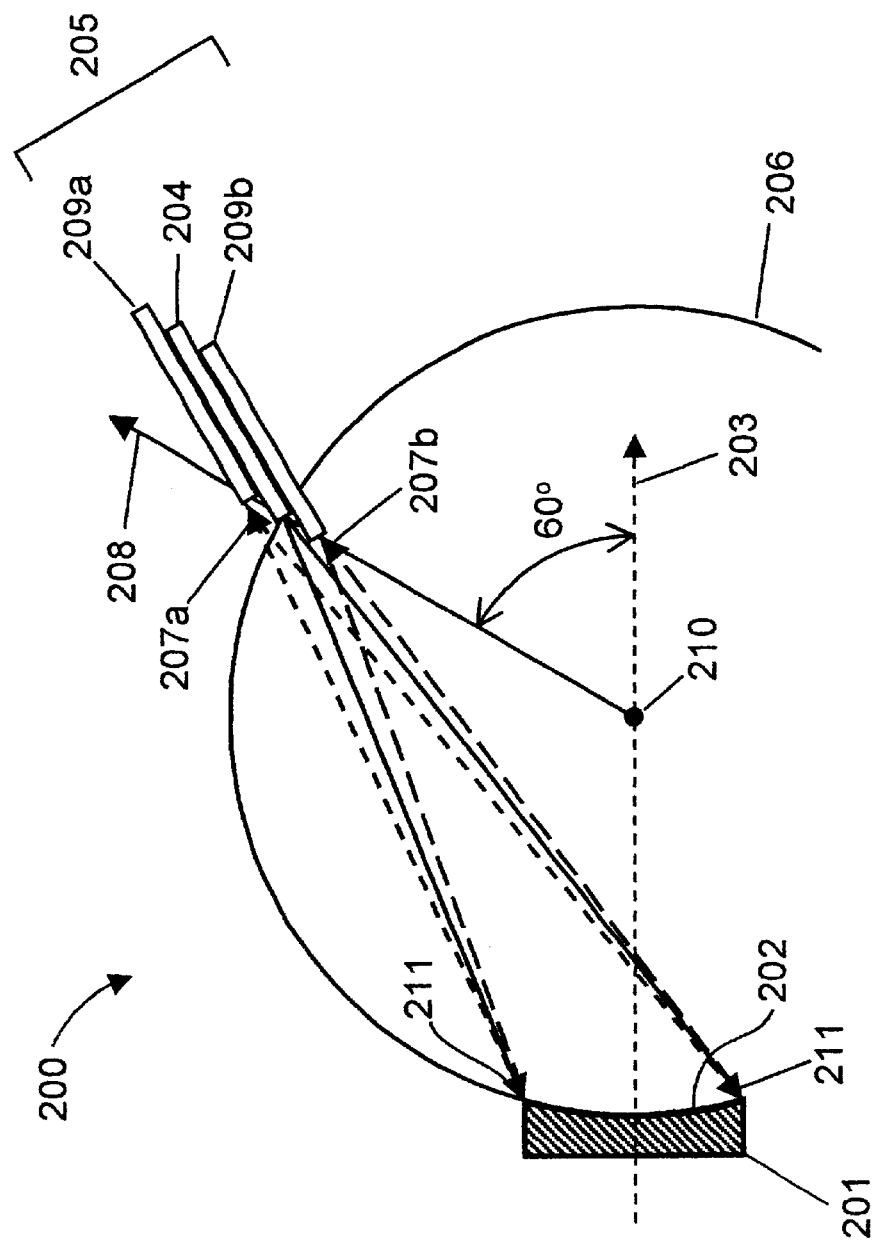
FIGS. 2a and 2b illustrate a top and a side view, respectively, of a prior-art grating-based channel separator employing a concave holographic grating in stationary anastigmatic Littrow configuration.

In the single planar array embodiment shown in FIG. 7a, the fibers 209a–209e are all disposed within a plane that is at an angle $\phi$ ($\geq 0$) with respect to the dispersion plane of grating 302 and the fiber 204 is to the opposite side of the dispersion plane and is disposed at an angle of $-\phi$ ($\leq 0$) with respect to the dispersion plane. In the double planar array embodiment shown in FIG. 7b, the fibers 204, 213a–213d are all disposed within a first plane, and the fibers 212, 209a–209d are all disposed within a second plane wherein both the second and first planes are disposed at an angle $\phi$ ($\geq 0$) and at an angle $-\phi$($\geq 0$) to the grating dispersion plane. The centers of the end faces of all fibers are disposed within the plane 208 (FIG. 2a) in either the single or double planar array configuration. The spacings between fibers within either the first or second plane need not be regular, and the inter-fiber spacings within the first plane need not be the same as those within the second plane. The fibers 209a–209d comprise a first set 710 of output/input fibers and the fibers 213a–213d comprise a second set 720 of output/input fibers.

As a de-multiplexer, a wavelength division multiplexed composite optical signal is input to the channel separator through input/output fiber 204 or 212, the composite optical signal is separated into its individual component signals by the grating 302, the separated signals are spatially dispersed by the grating 302 according to their respective wavelengths, and each individual signal is directed and focused onto a different respective fiber of the plurality of output/input fibers 209a, 209b, 209c . . . or 213a, 213b, 213c . . . , respectively. The individual signals are then output from the channel separator along respective individual output/input fibers of the set 209a, 209b, 209c . . . or 213a, 213b, 213c . . . , respectively. As a multiplexer, individual signals are input to the channel separator from respective individual fibers of the plurality of output/input fibers 209a, 209b, 209c . . . or 213a, 213b, 213c . . . , the signals are diffracted by the grating 302 along a single direction so as to be combined into a single composite optical signal and the composite optical signal is focused onto the end of the input/output fiber 204 or 212, respectively, so as to be output from the channel separator therein.

Figure 2B:
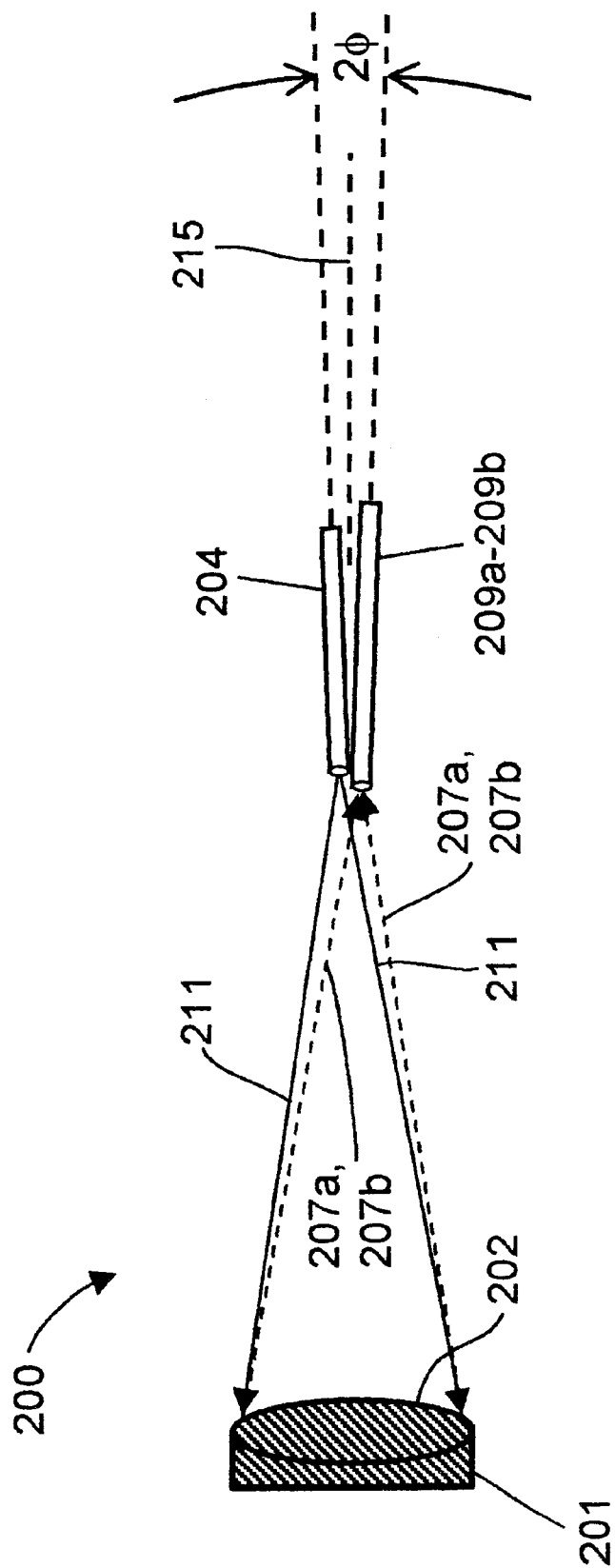
Figure 7C:
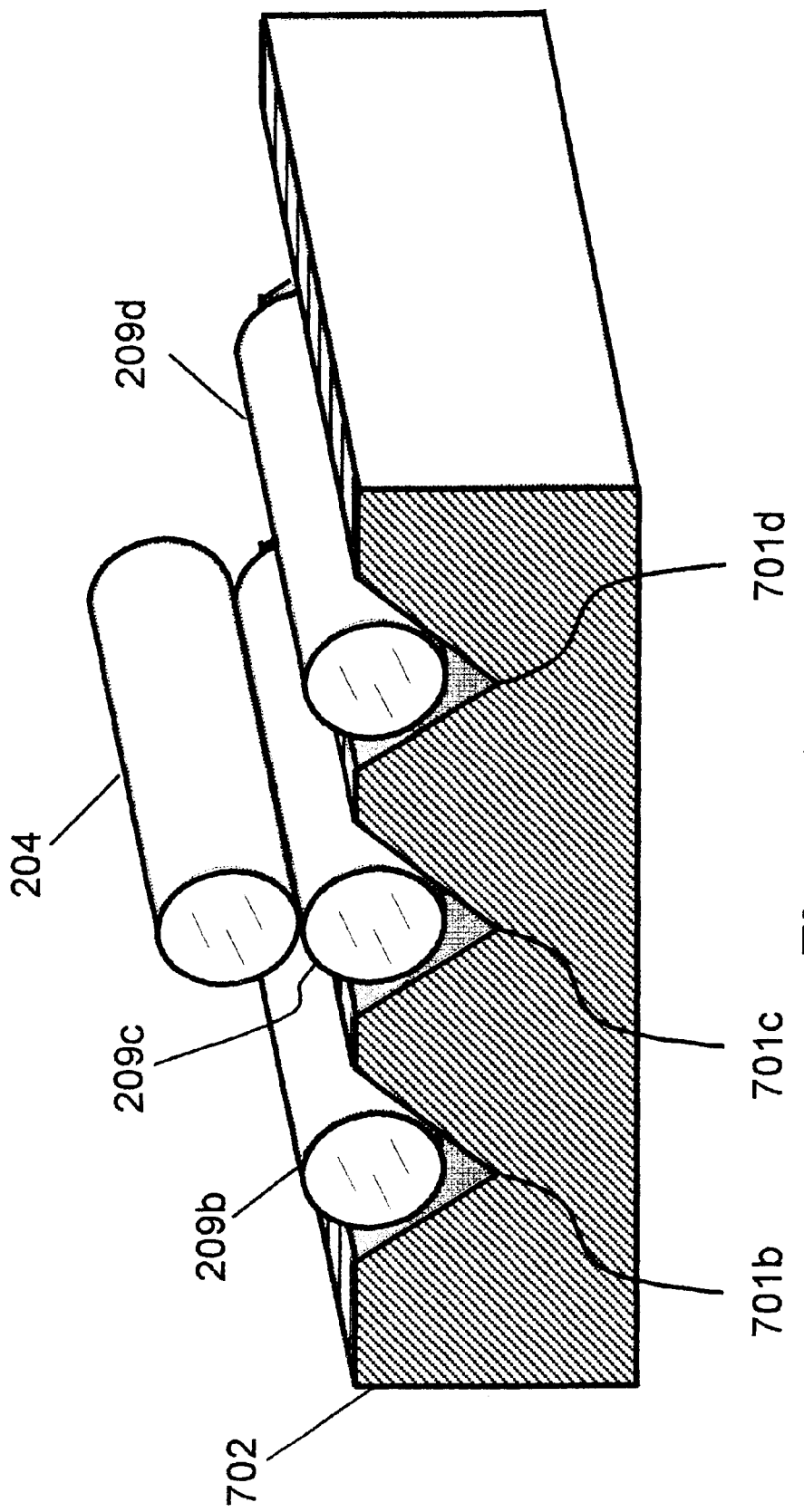
FIG. 7c illustrates the precise alignment of fibers in the single planar array configuration in the channel separator in accordance with the present invention.

FIG. 7c illustrates the precise alignment of fibers in the single planar array configuration of the channel separator in accordance with the present invention. The fibers 209b–209d are disposed within a set of V-grooves 701b–701d, pre-cut or pre-formed within a face of the fiber alignment block 702, preferably using well-known photolithographic masking and etching processes. The fiber 204 is disposed out of the plane of the set of fibers 209b–209d and is held securely in place by an opposing pressure plate, by a set of adjacent non-light transmitting fibers, or by some other securing mechanism (not shown). The long axis of fiber 204, in general, makes an angle of 2φ with respect to that of the fiber with which it is in contact (FIG. 2b), where the situation in which 2φ=0 is also permitted (FIG. 7c). When the double planar array configuration (FIG. 7b) is utilized, additional fibers 213a–213c are disposed to either side of fiber 204 in substantially the same plane as fiber 204.

FIG. 7d illustrates an end view and a side view of the fiber alignment block of the channel separator in accordance with the present invention. Each one of the set 209a–209n of fibers is disposed within a respective one of the V-grooves 701a–701n. The fibers are securely held in place within the V-grooves by epoxy or other adhesive and/or by a pressure plate (not shown) such that either the single plane of fibers comprising a single planar array or the two planes of fibers comprising a double planar array is (are) parallel to the top face of the fiber alignment block 702. One end face 711 of the fiber alignment block 702 is cut at a 60° angle and the end faces of the fibers of set 209a–209n are disposed in alignment with the face 711. In operation, the end face 711 faces the grating block 300. A recess 712 is disposed at the opposite end of the fiber alignment block 702 from face 711 to provide strain relief for the fibers.

Figure 7E:
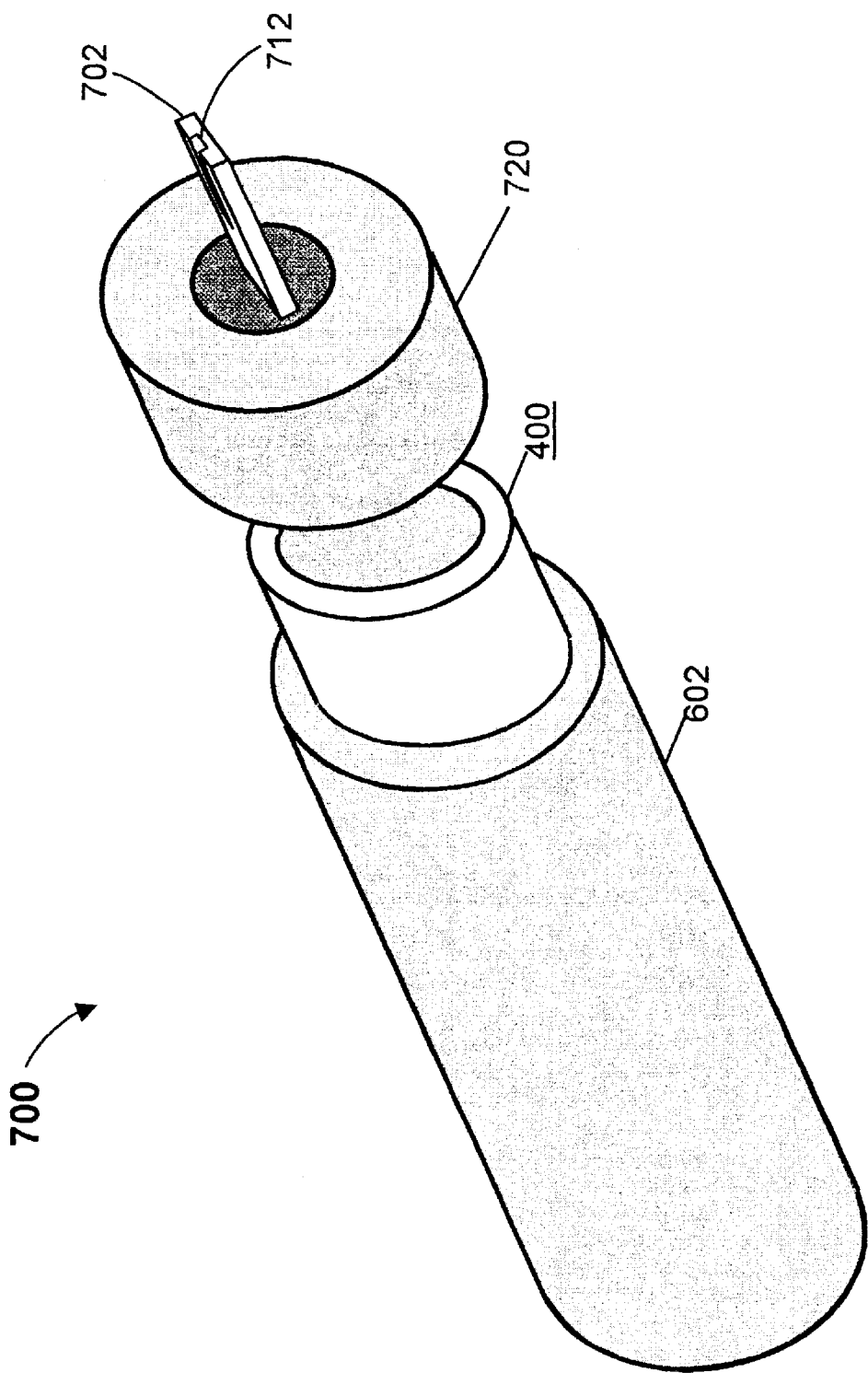
FIG. 7e illustrates a perspective view of the assembled channel separator in accordance with the present invention.

FIG. 7e illustrates a perspective view of the assembled channel separator in accordance with the present invention. The fiber alignment block 702 is positioned within an end cap 720 such that the angled face 711 of the block 702 and the ends of the fibers of set 205 face towards the grating block 300. The end cap 720 provides freedom for lateral and angular adjustment of the disposition of the plane of the top face of the fiber alignment block 702. The fiber alignment block 702 is secured to the end cap 720 by epoxy, solder, or other securing mechanism or adhesive, and the end-cap 720 is secured to the sleeve 602. The final package is thereby hermetically sealed to protect the internal parts from environmental stresses or changes.

Figure 8A:
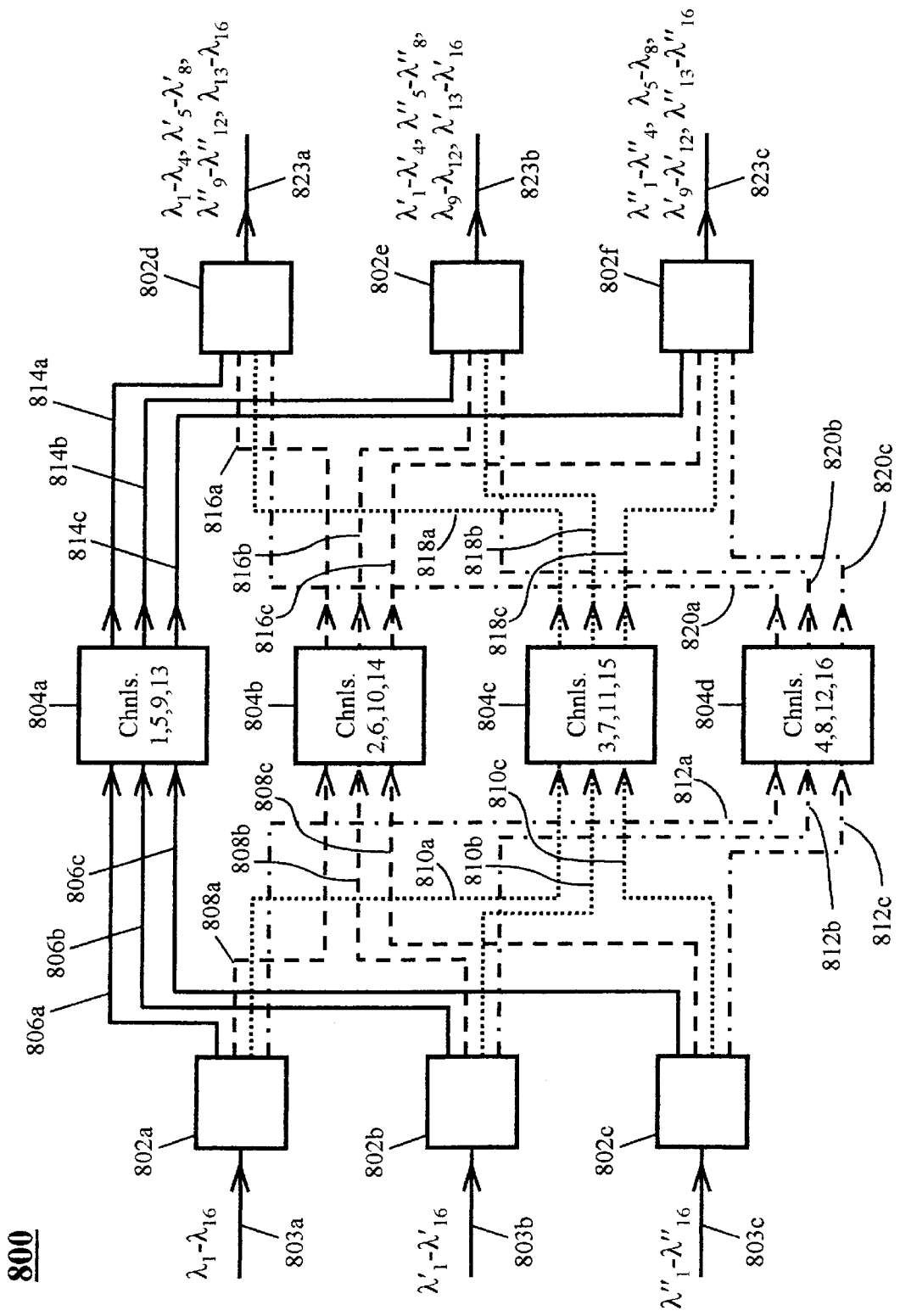
FIG. 8a illustrates a first preferred embodiment of an optical cross connect (OXC) with utilizes the grating-based channel separator in accordance with the present invention.
Figure 8B:
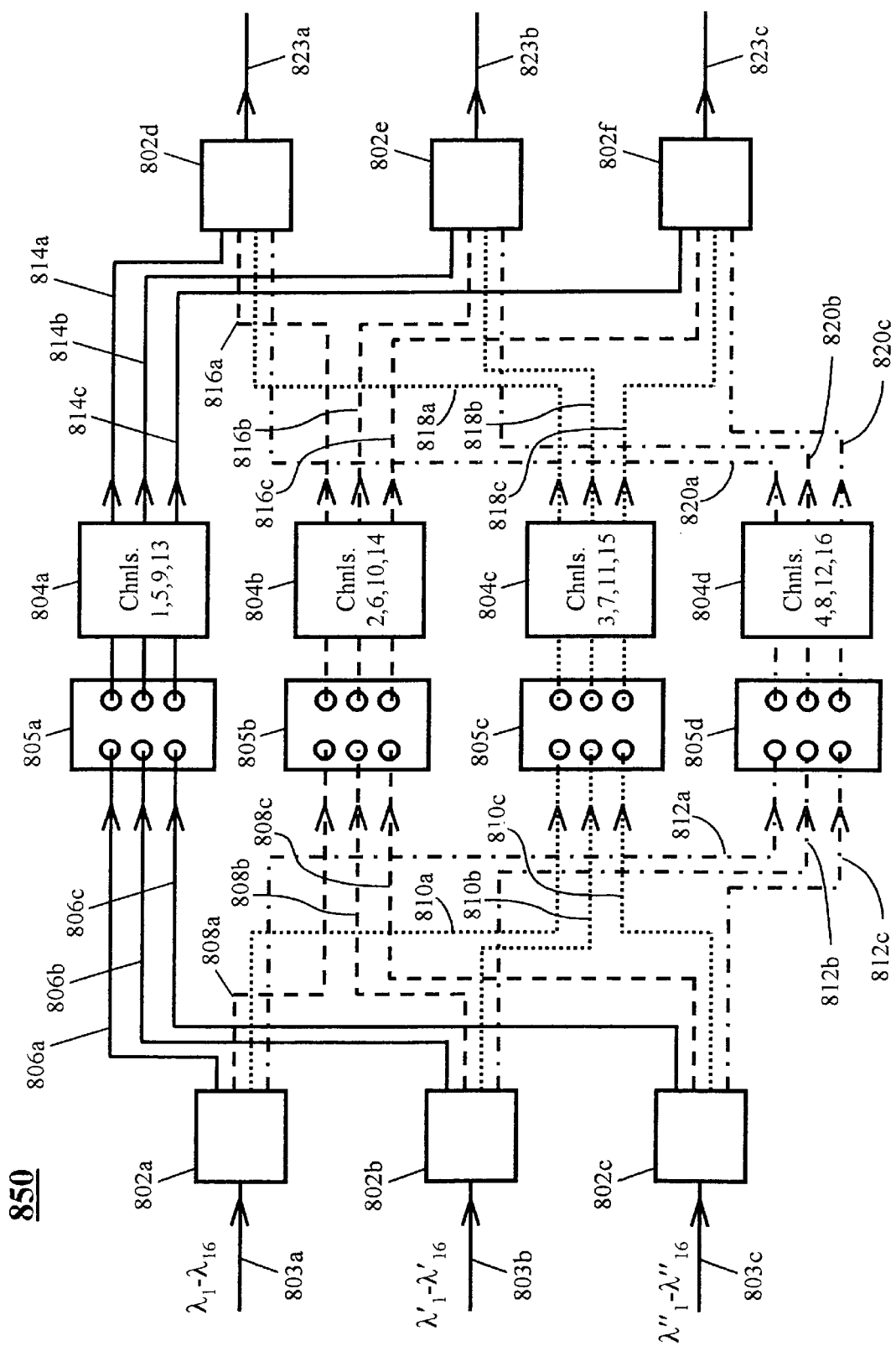
FIG. 8b illustrates a second preferred embodiment of an OXC which utilizes the grating-based channel separator in accordance with the present invention.

FIGS. 8a and illustrate a first and a second preferred embodiment, respectively, of an OXC which utilizes the grating-based channel separator in accordance with the present invention. Both the first OXC 800 (FIG. 8a) and the second OXC 850 (FIG. 8b) comprise k input fiber lines and k output fiber lines, where k is an arbitrary number. To simplify the discussion, in both the OXC 800 and the OXC 850, the number of such input and output lines is limited to three (that is, k=3) and the input lines are denoted as 803a–803c and the output lines are denoted as 823a–823c.

Each one of the k input lines in OXC 800 and OXC 850 is optically coupled to a respective 1×m interleaved channel separator 802a–802c used as a de-multiplexer. Similarly, each one of the k output lines is optically coupled to a respective m×1 interleaved channel separator 802d–802f used as a multiplexer. In the preferred embodiment, each of the interleaved channel separators 802d–802f is of the type disclosed in a co-pending U.S. patent application, entitled "Fiber Optic Wavelength Division Multiplexer With a Phase Differential Method of Wavelength Separation Utilizing a Polarization Beam Splitter and a Nonlinear Interferometer", Ser. No. 09/129,635, filed Aug. 6, 1998. This U.S. Patent Application is hereby incorporated by reference. The 1×m de-multiplexers 802a–802c each comprise one input and m outputs and the m×1 multiplexers 802d–802f each comprise m inputs and 1 output. Generally, the multiplexer channel separators 802d–802f and the de-multiplexer channel separators 802a–802c are identical to one another, except that signal propagation in the multiplexers is logically opposite to that in the de-multiplexers. The inputs of the de-multiplexers 802a–802c are optically coupled to the input lines 803a–803c, respectively and the outputs of the multiplexers 802d–802f are optically coupled to the output lines 823a–823c, respectively.

To simplify the discussion, in both the OXC 800 and the OXC 850, the number m of de-multiplexer outputs and multiplexer inputs is set equal to four (that is, m=4) and each such output or input comprises four channels. Therefore, the number of channels N carried by each of the k input fiber lines 803a–803c and by each of the output fiber lines 823a–823c is equivalent to sixteen (that is, N=16). For instance, the channels carried by input lines 803a–803c are denoted as $\lambda_1-\lambda_{16}$, $\lambda'_1-\lambda'_{16}$ and $\lambda''_1-\lambda''_{16}$, respectively.

In the OXC 800 (FIG. 8a) each one of the de-multiplexers 802a–802c and each one of the multiplexers 802d–802f is optically coupled to each one of a plurality m of k×k channel routers 804a–804d. The configuration in OXC 850 (FIG. 8b) is similar except that each one of the de-multiplexers 802a–802c (multiplexers 802d–802f) is optically coupled to each one of a plurality m of k×k optical switches 805a–805d, each one of the multiplexers 802d–802f (de-multiplexers 802a–802c) is optically coupled to each one of a plurality m of k×k channel routers 804a–804d, and each optical switch 805a–805d is optically coupled to exactly one of the channel routers 804a–804d and vice versa.

Since, for each one of the illustrative OXC's 800 and 850, m=4 and k=3, each such OXC comprises four 3×3 channel routers denoted as 804a–804d. Also, the OXC 850 comprises four 3×3 optical switches denoted as 805a–805d, wherein each one of the optical 805a–805d is optically coupled to a respective one of the channel routers 804a–804d.

The channel routers 804a–804d comprise a common channel resolution that is m times greater (that is, less fine) than the common channel resolution of the interleaved channel separators 802a–802f. For instance, in the examples shown in FIGS. 8a–8b, since there are four outputs from each de-multiplexer and four inputs to each multiplexer (that is, m=4), then, if the common channel resolution, or spacing between channels of the interleaved channel separators 802a–802f is 50 GHz, then the common channel resolution of each of the grating based channel routers 804a–804d is four times greater, or 200 GHz.

According to the operation of each of the 1×4 interleaved channel separators comprising the de-multiplexers 802a–802c, the first, second, third and fourth outputs respectively carry a first, second, third and fourth set of channels. Specifically, for sequentially numbered channels, the first output comprises the first, fifth, ninth and thirteenth channel, the second output comprises the second, sixth, tenth and fourteenth channel, the third output comprises the third, seventh, eleventh and fifteenth channel and the fourth output comprises the fourth, eighth, twelfth and sixteenth channel. For instance, the channels $\lambda_1-\lambda_{16}$ input to channel separator 802a by fiber line 803a are separated into four outputs 806a, 808a, 810a and 812a respectively comprising the first set of channels $\{\lambda_1, \lambda_5, \lambda_9, \lambda_{13}\}$, the second set of channels $\{\lambda_2, \lambda_6, \lambda_{10}, \lambda_{14}\}$, the third set of channels $\{\lambda_3, \lambda_7, \lambda_{11}, \lambda_{15}\}$ and the fourth set of channels $\{\lambda_4, \lambda_8, \lambda_{12}, \lambda_{16}\}$. The channel separator 802b outputs similar sets of channels 806b, 808b, 810b and 812b. The channel separator 802c outputs similar sets of channels 806c, 808c, 810c and 812c.

The first set of channels output from each of the de-multiplexers 802a–802c, that is set 806a of channels {$\lambda_1$, $\lambda_5$, $\lambda_9$, $\lambda_{13}$}, the set 806b of channels {$\lambda'_1$, $\lambda'_5$, $\lambda'_9$, $\lambda'_{13}$} and the set of 806c channels {$\lambda''_1$, $\lambda''_5$, $\lambda''_9$, $\lambda''_{13}$}, is directed to and input to the first 3×3 channel router 804a. Likewise, the second sets of channels 808a, 808b and 808c are all input to the second 3×3 channel router 804b, the third sets of channels 810a, 810b and 810c are all input to the third 3×3 channel router 804c and the fourth sets of channels 812a, 812b and 812c are all input to the fourth 3×3 channel router 804d.

Each of the channel routers 804a–804d separates input channels and re-combines the separated channels into new sets of output channels. In the preferred embodiment, each of the channel routers 804a–804c is comprised of the grating-based channel separator 700 in accordance with the present invention, previously described, except that the channel router comprises a plurality of input fibers 204a–204c as shown in FIG. 8c. Each such input fiber of a channel router carries a set of channels delivered from one of the outputs of one of the de-multiplexers 802a–802c.

FIG. 8c illustrates one possible configuration of input fibers 204a–204c and intermediate fibers 209a–209f comprising, for instance, the channel router 804a. Other aspects of the channel router 804a are identical to the grating-based channel separator 700 (FIG. 7e) in accordance with the present invention. Each of the input fibers 204a–204c (FIG. 8c) carries the set respective 806a–806c of channels, wherein each such set comprises the first, fifth, ninth and thirteenth channel of composite optical signals derived from the input fiber lines 803a–803c, respectively. Each such set of channels is de-multiplexed to four of the six intermediate fibers 209a–209f by the grating-based channel separator comprising the channel router according to the functionality described previously herein.

As illustrated by the shaded circles in FIG. 8c, channels $\lambda_1$, $\lambda_5$, $\lambda_9$, and $\lambda_{13}$ of set 806a input at fiber 204a are de-multiplexed to the intermediate fibers 209c, 209d, 209e and 209f, respectively. Simultaneously, the channels $\lambda'_1$, $\lambda'_5$, $\lambda'_9$, and $\lambda'_{13}$ of set 806b are respectively de-multiplexed to the intermediate fibers 209b, 209c, 209d and 209e and the channels $\lambda''_1$, $\lambda''_5$, $\lambda''_9$, and $\lambda''_{13}$ of set 806c are respectively de-multiplexed to the intermediate fibers 209a, 209b, 209c and 209d.

Figure 8D:
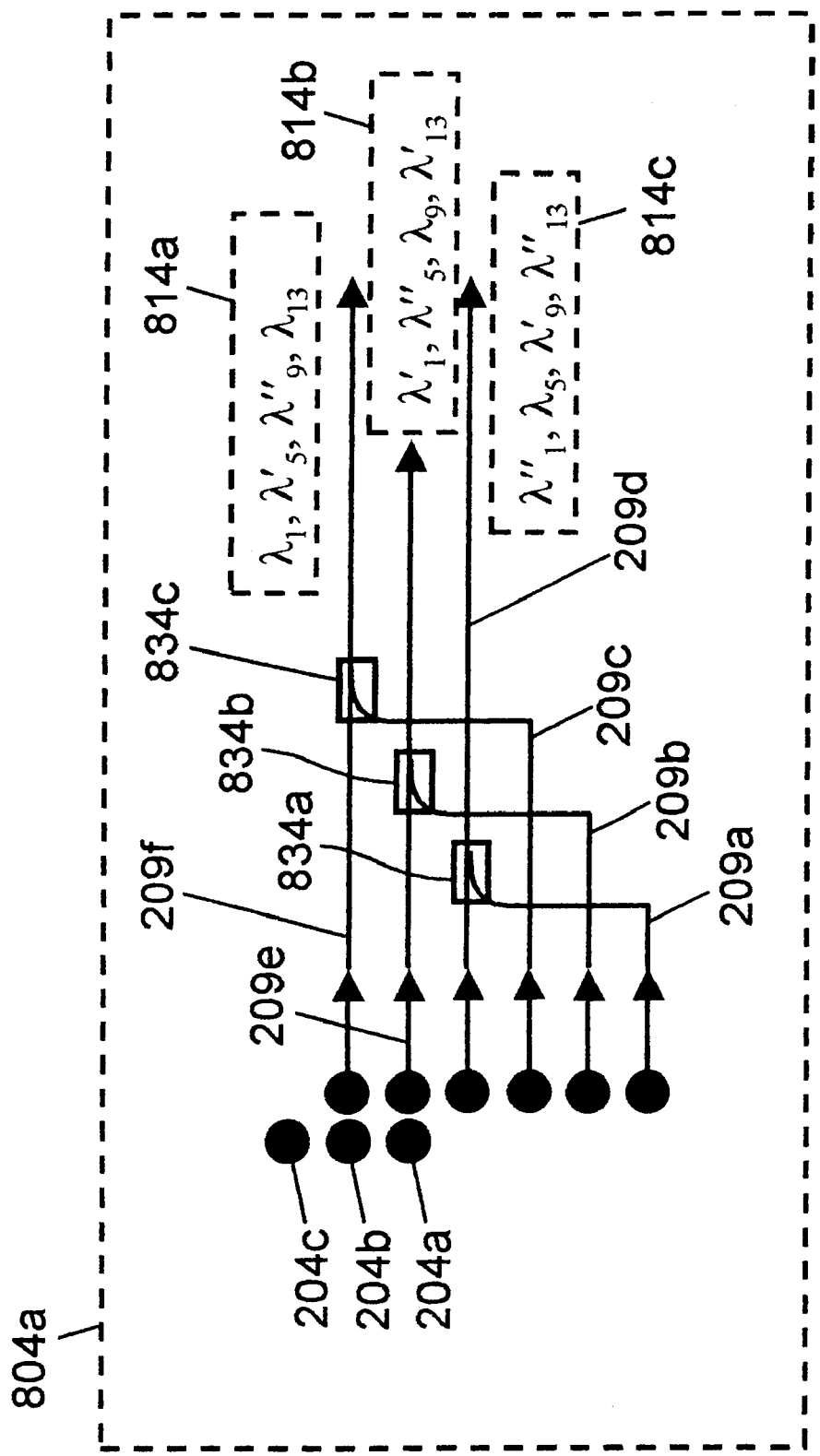
FIG. 8d illustrates a grating-based channel router within an OXC in accordance with the present invention.

The first 209a, second 209b, third 209c, fourth 209d, fifth 209e and sixth 209f intermediate fiber respectively receives the single channel $\lambda''_1$, the pair of channels $\lambda'_1$ and $\lambda''_5$, the trio of channels $\lambda_1$, $\lambda'_5$ and $\lambda''_9$, the trio of channels $\lambda_5$, $\lambda'_9$ and $\lambda''_{13}$, the pair of channels $\lambda_9$ and $\lambda'_{13}$, and the single channel $\lambda_{13}$. Because unequal numbers of channels are multiplexed or delivered to the various intermediate fibers, the sets of channels are subsequently combined as illustrated in FIG. 8d for the channel router 804a of OXC 800 (or OXC 850). The channels carried by fibers 209a–209c are merged onto fibers 209d–209f, respectively, by the directional couplers or multiplexers 834a–834c. Subsequently, each of the fibers 209d–209f carries four channels, specifically the set 814a of channels {$\lambda_1$, $\lambda'_5$, $\lambda''_9$, $\lambda_{13}$}, the set 814b of channels {$\lambda'_1$, $\lambda''_5$, $\lambda_9$, $\lambda'_{13}$} and the set 814c of channels {$\lambda''_1$, $\lambda_5$, $\lambda'_9$, $\lambda''_{13}$}, respectively. The fibers 209d–209f comprise the three outputs of the channel router 804a.

Referring again to FIGS. 8a–8b, after passing through the channel routers 804a–804d, the re-combined channels are delivered to the 4×1 multiplexers 802d–802f as shown for the OXC 800 in FIG. 8a and for the OXC 850 in FIG. 8b. Each one of the three outputs of each of the channel routers 804a–804c is directed to a different respective multiplexer. The outputs 814a–814c of first channel router 804a are directed to the respective first input ports of the 4×1 multiplexers 802d–802f. Likewise, the three outputs 816a–816c of second channel router 804b are directed to the respective second input ports of the 4×1 multiplexers 802d–802f, the three outputs 818a–818c of third channel router 804c are directed to the respective third input ports of the 4×1 multiplexers 802d–802f and the three outputs 820a–820c of fourth channel router 804d are directed to the respective fourth input ports of the 4×1 multiplexers 802d–802f.

The first, second, third and fourth input of each one of the multiplexers 802d–802f receives wavelengths corresponding to the first, fifth, ninth and thirteenth, to the second, sixth, tenth and fourteenth, to the third, seventh, eleventh and fifteenth and to the fourth, eighth, twelfth and sixteenth channels of any composite optical signal. Each one of the multiplexers 802d–802f then recombines these wavelengths into a new composite optical signal that is output to one of the output lines 823a–823c. For example, as shown in FIG. 8a, the multiplexer 802d combines the channels of set 814a together with those of set 816a, of set 818a and of set 820a into a new composite signal that is output to the output fiber line 823a. Assuming that the channel routing in every case is analogous to that illustrated in FIGS. 8c–8d, then, in the OXC 800, this new composite signal comprises the sixteen channels $\lambda_1$–$\lambda_4$, $\lambda'_5$–$\lambda'_8$, $\lambda''_9$–$\lambda''_{12}$, $\lambda_{13}$–$\lambda_{16}$. Similarly, the new composite optical signal output to fiber line 823b comprises the sixteen channels $\lambda'_1$–$\lambda'_4$, $\lambda''_5$–$\lambda''_8$, $\lambda_9$–$\lambda_{12}$, $\lambda'_{13}$–$\lambda'_{16}$ and the new composite optical signal output to fiber line 823c comprises the sixteen channels $\lambda''_1$–$\lambda''_4$, $\lambda_5$–$\lambda_8$, $\lambda'_9$–$\lambda'_{12}$, $\lambda''_{13}$–$\lambda''_{16}$. In this way, each output composite optical signal comprises a different selection of channels derived from the original input sources, and an optical cross connect operation is performed.

The OXC 850 (FIG. 8b) operates similarly to the OXC 800 (FIG. 8a) except that one a set of 3×3 optical switches 805a–805d is disposed directly before and optically coupled to each respective one of the channel routers 804a–804d. Each such 3×3 optical switch provides six different permutations of inputs to the three input ports of the channel router to which it is coupled. Since each such switch operates independently of all of the others, there exist, in the illustrative embodiment shown in FIG. 8b, a total of 1296 different combinations of outputs to the output lines 823a–823c. More generally, for k input lines, k output lines, m inputs to the multiplexers and outputs from the de-multiplexers, m k×k switches, and m k×k channel routers, the total number of channel output permutations is equivalent to $(k!)^m$.

An improved OXC which utilizes a grating-based channel separator has been disclosed. A preferred embodiment of the OXC comprises interleaved channel separators and grating-based channel separators. Each grating-based channel separator comprises a packaging comprised of a concave holographic reflection grating with an alignment surface, a first hollow sleeve or cylinder with a three point mount for contacting the concave holographic reflecting grating and alignment surface, a pin or plate to align the alignment surfaces of the grating and the first hollow sleeve or cylinder, and a second hollow sleeve or cylinder with a spring-loaded holding mechanism in contact with the back side of the grating substrate. This grating-based channel separator affords a quick, easy, precise and reproducible positioning and alignment of the grating block. Thus, the OXC is minimized in size while also reproducibly assembled with perfect alignment in a minimal amount of time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical cross connect (OXC), comprising:
   a plurality of de-multiplexing interleaved channel separators;
   a plurality of multiplexing interleaved channel separators; and
   a plurality of channel routers optically coupled between the plurality of de-multiplexing interleaved channel separators and the plurality of multiplexing interleaved channel separators, wherein each of the channel routers comprises:
   a grating comprising an alignment surface,
   a first sleeve comprising a mount, the mount capable of contacting the grating, and
   an alignment plate coupled to an outer surface of the first sleeve, wherein the alignment plate is capable of contacting the alignment surface of the grating.

2. The OXC of claim 1, wherein each of the plurality of de-multiplexing interleaved channel separators and each of the plurality of multiplexing interleaved channel separators comprises:
   at least one of a first optic fiber;
   at least one of a first lens optically coupled to the first optic fiber;
   at least two of a second optic fiber optically coupled to the first lens;
   at least one of a second lens optically coupled to the second optic fibers which are not optically coupled to the first lens;
   a polarization beam splitter optically coupled to the lenses; and
   at least two nonlinear interferometers optically coupled to the polarization beam splitter.

3. The OXC of claim 1, wherein the grating comprises a substrate plate, the substrate plate comprising:
   a concave holographic grating surface; and
   the alignment surface at an oblique angle to the grating surface.

4. The OXC of claim 3, wherein the substrate plate comprises a low-thermal-expansion substrate.

5. The OXC of claim 3, wherein the grating surface diffracts light such that the grating surface operates in a Littrow configuration.

6. The OXC of claim 3, wherein the grating surface comprises a reflective concave surface in a geometric form of a spherical cap.

7. The OXC of claim 6, wherein a grating axis of the grating surface is substantially perpendicular to a chord to the grating surface at a center of the spherical cap.

8. The OXC of claim 3, wherein the substrate plate further comprises:
   a back surface opposite to the grating surface, wherein the back surface is substantially flat and substantially perpendicular to a grating axis of the grating surface.

9. The OXC of claim 1, wherein the first sleeve comprises a low-thermal-expansion material.

10. The OXC of claim 1, wherein the first sleeve is cylindrical in cross-section.

11. The OXC of claim 1, wherein the first sleeve comprises:
    a slanted surface at an end of the first sleeve;
    the mount coupled to the slanted surface; and
    a slot on the outer surface of the first sleeve coupled to the alignment plate.

12. The OXC of claim 11, wherein the slanted surface is disposed at an angle such that an axis of the first sleeve is substantially parallel to a Littrow axis of the grating.

13. The OXC of claim 11, wherein the mount comprises a plurality of mounting pins.

14. The OXC of claim 1, wherein each of the channel routers further comprises:
    a second sleeve, wherein at least a portion of the grating, the first sleeve, and the alignment plate are capable of residing within the second sleeve.

15. The OXC of claim 14, wherein the second sleeve comprises:
    an open end;
    a sealed end opposite to the open end; and
    a holding mechanism coupled to the sealed end and residing within the second sleeve, wherein the holding mechanism is capable of applying force to the grating to place the grating into proper alignment with the mount and the alignment plate.

16. The OXC of claim 15, wherein the holding mechanism is spring-loaded.

17. The OXC of claim 14, further comprising:
    an end cap coupled to an open end of the second sleeve; and
    a fiber alignment block coupled to the end cap and optically coupled to the grating.

18. The OXC of claim 17, wherein the fiber alignment block comprises:
    a plurality of fibers;
    a plurality of grooves for holding the plurality of fibers;
    an angled end face facing the grating; and
    a recess at an end opposite to the angled end face.

19. The OXC of claim 1, further comprising:
    a plurality of switches optically coupled between the plurality of de-multiplexing interleaved channel separators and the plurality of channel routers.

20. The OXC of claim 1, further comprising:
    plurality of switches optically coupled between the plurality of multiplexing interleaved channel separators and the plurality of channel routers.

21. A method for routing a plurality of channels in a plurality of composite optical signals, comprising the steps of:
    (a) de-multiplexing the plurality of composite optical signals into sets of channels, wherein the sets of channels are interleaved;
    (b) delivering the set of channels to a plurality of channel routers, wherein each of the plurality of channel routers comprises:
    a grating comprising an alignment surface,
    a first sleeve comprising a mount, the mount capable of contacting the grating, and
    an alignment plate coupled to an outer surface of the first sleeve, wherein the alignment plate is capable of contacting the alignment surface of the grating;
    (c) dispersing the set of channels into individual channels by the grating;

(d) recombining the individual channels into new sets of channels; and (e) multiplexing the new sets of channels into a new plurality of composite optical signals.

22. An optical cross connect (OXC), comprising:

a plurality of de-multiplexing interleaved channel separators;

a plurality of switches optically coupled to the plurality of de-multiplexing interleaved channel separators;

plurality of channel routers optically coupled to the plurality of switches, wherein each of the channel routers comprises:
  a grating comprising an alignment surface,
  a first sleeve comprising a mount, the mount capable of contacting the grating, and
  an alignment plate coupled to an outer surface of the first sleeve, wherein the alignment plate is capable of contacting the alignment surface of the grating; and a plurality of multiplexing interleaved channel separators optically coupled to the plurality of channel routers.

23. An optical cross connect (OXC), comprising:

a plurality of de-multiplexing interleaved channel separators;

a plurality of channel routers optically coupled to the plurality of de-multiplexing interleaved channel separators, wherein each of the channel routers comprises:
  a grating comprising an alignment surface,
  a first sleeve comprising a mount, the mount capable of contacting the grating, and
  an alignment plate coupled to an outer surface of the first sleeve, wherein the alignment plate is capable of contacting the alignment surface of the grating;

a plurality of switches optically coupled to the plurality of channel routers; and a plurality of multiplexing interleaved channel separators optically coupled to the plurality of switches.

* * * * *